US011301838B2

(12) United States Patent
Thompson et al.

(10) Patent No.: US 11,301,838 B2
(45) Date of Patent: Apr. 12, 2022

(54) SYSTEMS AND METHODS FOR USING NETWORK EXTENSIONS

(71) Applicant: MASTERCARD INTERNATIONAL INCORPORATED, Purchase, NY (US)

(72) Inventors: Emily Marie Thompson, St. Peters, MO (US); Corey M. Hively, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 162 days.

(21) Appl. No.: 15/975,176

(22) Filed: May 9, 2018

(65) Prior Publication Data

US 2019/0347649 A1 Nov. 14, 2019

(51) Int. Cl.
*G06Q 20/36* (2012.01)
*H04L 67/00* (2022.01)
(Continued)

(52) U.S. Cl.
CPC ............ *G06Q 20/36* (2013.01); *G06Q 30/06* (2013.01); *H04L 67/02* (2013.01); *H04L 67/34* (2013.01); *G06Q 20/12* (2013.01)

(58) Field of Classification Search
CPC ........ G06Q 20/36; G06Q 20/12; G06Q 30/06; G06Q 40/00; H04L 67/02; H04L 67/34
(Continued)

(56) References Cited

U.S. PATENT DOCUMENTS

| 7,899,710 B1 * | 3/2011 | Walker | G06Q 30/0224 |
| | | | 705/14.54 |
| 2008/0133349 A1 * | 6/2008 | Nazer | G06Q 30/0239 |
| | | | 705/14.39 |

(Continued)

OTHER PUBLICATIONS

Mohamed M.E.A. Mahmoud and Xuemin (Sherman) Shen, A Secure Payment Scheme with Low Communication and Processing Overhead for Multihop Wireless Networks, available at the URL of (and attached as PDF) https://ieeexplore.ieee.org/stamp/stamp.jsp?tp=&arnumber=6175892 (Year: 2013).*

*Primary Examiner* — Christopher Bridges
*Assistant Examiner* — Timothy T. Hsieh
(74) *Attorney, Agent, or Firm* — Harness, Dickey & Pierce, P.L.C.

(57) ABSTRACT

Systems and methods are provided for facilitating network transactions through use of browser extensions. One exemplary method includes accessing a virtual location associated with an entity through a web browser and receiving, from a user, a selection of a browser extension associated with the web browser, when at least one product is designated by the user at the virtual location. The method also includes calling a first application programming interface (API) associated with a virtual account platform, based on the selection of the browser extension, requesting virtual account information for the user from the virtual account platform, and displaying the virtual account information to the user. The method further includes calling a second API associated with the entity, requesting a transaction amount for the at least one (Continued)

product, and submitting a request for a network transaction based on the received virtual account information and the received transaction amount.

18 Claims, 3 Drawing Sheets

(51) Int. Cl.
*G06Q 30/06* (2012.01)
*H04L 67/02* (2022.01)
*G06Q 20/12* (2012.01)

(58) Field of Classification Search
USPC .................................................. 705/35, 39
See application file for complete search history.

(56) References Cited

U.S. PATENT DOCUMENTS

| | | | |
|---|---|---|---|
| 2011/0145138 A1* | 6/2011 | Bradley | G06Q 20/10 |
| | | | 705/39 |
| 2011/0238533 A1* | 9/2011 | Shadchnev | G06Q 30/06 |
| | | | 705/27.1 |
| 2013/0013499 A1* | 1/2013 | Kalgi | G06Q 20/3674 |
| | | | 705/41 |
| 2014/0337175 A1* | 11/2014 | Katzin | G06Q 30/00 |
| | | | 705/26.62 |
| 2015/0220914 A1* | 8/2015 | Purves | G06Q 20/36 |
| | | | 705/26.8 |
| 2018/0108054 A1* | 4/2018 | Doubinski | G06Q 30/0601 |
| 2018/0181956 A1* | 6/2018 | Zarakas | G06Q 20/3226 |
| 2020/0175489 A1* | 6/2020 | Huang | G07F 9/002 |

\* cited by examiner

SYSTEMS AND METHODS FOR USING NETWORK EXTENSIONS

FIELD

The present disclosure generally relates to systems and methods for using network extensions and, in particular, to systems and methods for use of network extensions to facilitate interactions between network-based applications and network accounts associated with users.

BACKGROUND

This section provides background information related to the present disclosure which is not necessarily prior art.

Users are known to purchase products through virtual locations, such as, for example, through websites associated with merchants. Often, users will employ credit cards or other payment accounts to fund the purchases through the virtual locations. It is known for virtual locations to be integrated and/or associated with wallet platforms, whereby users are able to select to pay with virtual wallets (e.g., the MasterPass® virtual wallet from MasterCard®, the Apple Pay® virtual wallet from Apple®, the Samsung Pay® virtual wallet from Samsung®, etc.) integrated into the virtual locations of the merchants, by selecting "Pay with Virtual Wallet," for example. In connection therewith, the virtual locations interact with the virtual wallet platforms to facilitate payment account credentials for the users being provided to the merchants for accounts intended to fund the purchases at the virtual locations, or otherwise facilitate the transactions.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Consumers (broadly, users) often purchase products from virtual locations (e.g., websites, etc.) associated with merchants. In connection therewith, the consumers often either enroll/maintain merchant accounts with the merchants, or opt to pay with virtual wallets through virtual wallet options integrated and/or incorporated into the specific virtual locations associated with the merchants (e.g., via a "Pay with Wallet" button, etc.). In either instance, details of the consumers, such as names, shipping addresses, etc., and even payment account details are made available to the merchant virtual locations to facilitate the purchase transactions, without the consumers having to provide the specific details for each individual transaction themselves. Generally, in the absence of merchant accounts, or integration of virtual wallet payment options into the virtual locations of the merchants, the consumers are left with providing the details for each purchase transaction to the merchants.

Uniquely, the systems and methods herein employ browser extensions, in web browsers used to access merchant virtual locations, whereby the consumers are permitted to pay with their virtual wallets in the absence of any integration of virtual wallet payment options into the merchant virtual locations and in the absence of the consumers having any merchant accounts with the merchants. In particular, when shopping at a virtual location, and ready to checkout, a consumer may select a browser extension associated with a virtual wallet, which makes an application programming interface (API) call to a virtual wallet platform associated with the virtual wallet, where an account at the virtual wallet platform for the consumer may include, at the least, payment account credentials associated with a payment account of the consumer. In connection therewith, the payment account credentials associated with the payment account of the consumer is returned to the browser extension, which then calls an API associated with the merchant to retrieve the purchase amount and other details, as needed, for the purchase transaction. The browser extension, in turn, submits the transaction for processing, and returns a transaction confirmation and other information as needed (e.g., a shipping address, etc.) to the merchant when authorized. The merchant may then deliver the product(s) purchased to the consumer. In this manner, the consumer is permitted to utilize a virtual wallet payment option, even when not integrated with the virtual location of the merchant, and the merchant is permitted to accept the virtual wallet payment without integration of the virtual wallet therein.

Figure 1:
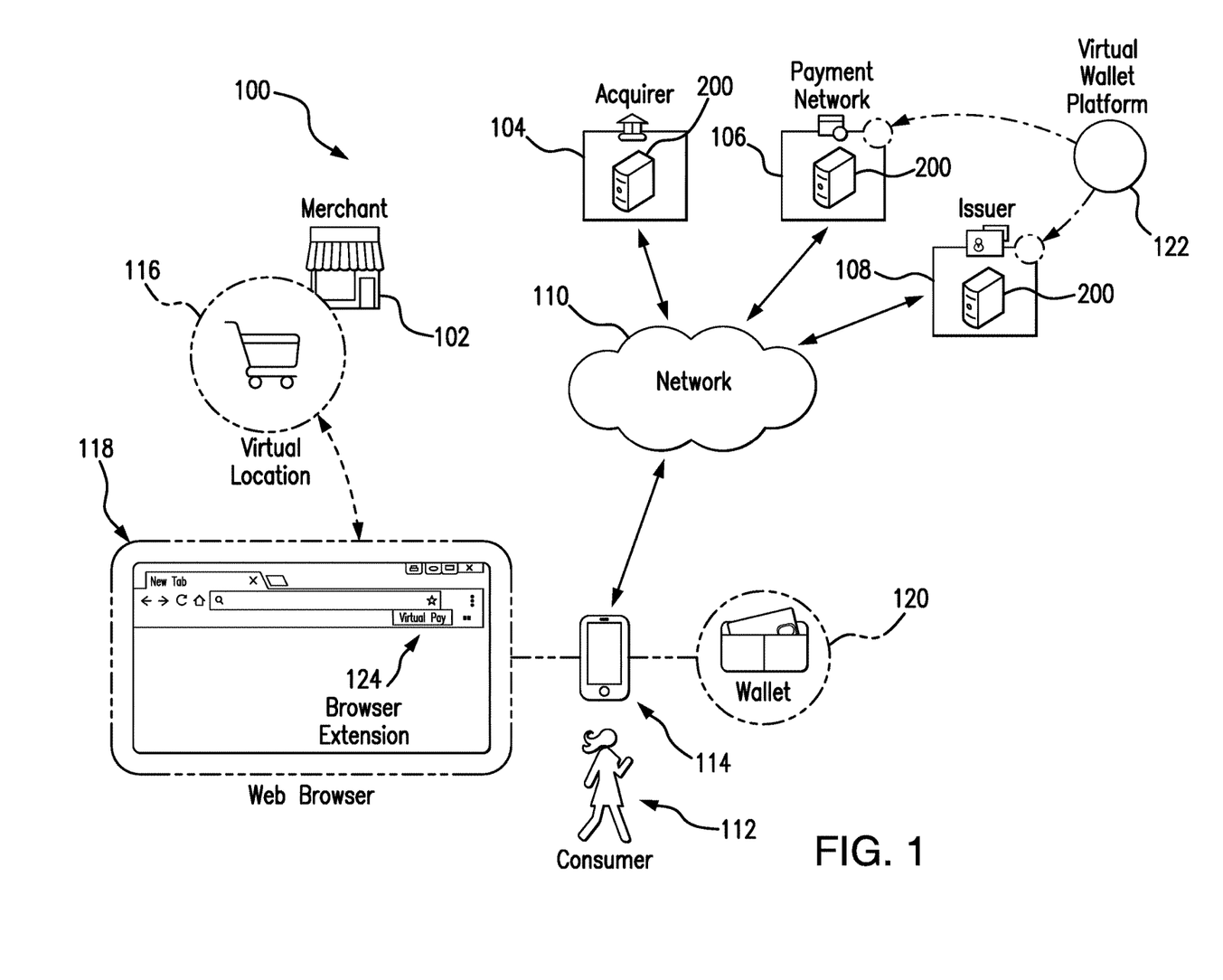
FIG. 1 is an exemplary system of the present disclosure suitable for use in facilitating virtual wallet purchase transactions through browser extensions associated with web browsers.

FIG. 1 illustrates an exemplary system 100 in which one or more aspects of the present disclosure may be implemented. Although the system 100 is presented in one arrangement, other embodiments may include the parts of the system 100 (or other parts) arranged otherwise depending on, for example, implementation of virtual wallets, interactions between the virtual wallets and web browsers hosting virtual locations, types of merchant virtual locations available for use in purchase transactions, etc.

The system 100 generally includes a merchant 102, an acquirer 104 associated with the merchant 102, a payment network 106, and an issuer 108 (all, broadly entities) configured to issue payment accounts (or other accounts) to consumers, each of which is coupled to (and is in communication with) network 110. The network 110 may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, network 110 may include multiple different networks, such as a private payment transaction network made accessible by the payment network 106 to the acquirer 104 and the issuer 108 and, separately, the public Internet, which may provide interconnection between the merchant 102, the payment network 106, and/or a consumer 112 (broadly, a user) via his/her communication device 114, etc.

The merchant 102 generally offers products (e.g., goods and/or services, etc.) for sale to consumers in the system 100, including the consumer 112, through a virtual location 116. The virtual location may include a website, or other suitable network-based application. In general, the virtual location 116 includes options to search for and/or browse products offered for sale by the merchant 102, view details of the products, add products to shopping carts and checkout, and to purchase the products from the merchant 102. It should be appreciated that the specific content of virtual location 116 may vary from merchant to merchant depending, for example, on the type of products offered for sale by the merchant 102, the manner in which the consumer 112 interacts with the products offered for sale, etc. In this exemplary embodiment, the virtual location 116 permits the consumer 112 to enroll in a merchant account, whereby the consumer 112 may store his/her name, shipping details, billing details (e.g., payment account credentials, etc.), etc. for use in facilitating transactions with the merchant 102 (e.g., network-based transactions such as payment account transactions, etc.), shipping products, etc. That said, such merchant accounts may be available but not used in some implementations of the present disclosure (e.g., the merchant accounts may not be available for consumer purchases initiated via the virtual location 116 of the merchant, consumers may elect not to use the merchant accounts for one or more purchases, etc.), or such merchant accounts may not be available or permitted in other virtual location embodiments. What's more, in this exemplary embodiment, there is no virtual wallet payment option integrated with and/or incorporated with the merchant's virtual location 116.

In the exemplary embodiment, the consumer 112 is associated with the communication device 114, which is network-enabled and is in communication with one or more other computing devices, including, for example, a computing device associated with the merchant 102 through the network 110. As shown in FIG. 1, the communication device 114 includes a web browser 118 (e.g., installed thereon, etc.) such as, for example, an Internet Explorer™ web browser, a Chrome™ web browser, a Firefox™ web browser, a Safari™ web browser, a Microsoft Edge™ web browser, or other suitable web browser, etc., which is configured with computer executable instructions that, when executed by the communication device 114, permit the consumer 112 to access one or more different web sites (e.g., virtual locations associated with entities (e.g., virtual location 116 associated with the merchant 102, etc.), etc.) via the communication device 114. In the example shown in FIG. 1, the consumer 112 is able to access and/or interact with the virtual location 116 of the merchant 102 through the web browser 118, as indicated by the dotted reference line between the virtual location 116 and the web browser 118.

In addition, the consumer 112 is associated with a payment account issued by the issuer 108. In connection therewith, the communication device 114 further includes a virtual wallet application 120. The virtual wallet application 120 is provisioned with a payment account credential specific to the payment account issued by the issuer 108 to the consumer 112 and may be usable to facilitate payment account transactions with merchants, including the merchant 102, when desired. In particular, the communication device 114 includes, for example, one or more of a Samsung Pay® virtual wallet, a MasterPass® virtual wallet, an Apple Pay® virtual wallet, a PayPal® virtual wallet, a Google Wallet® virtual wallet, an Android Wallet™ virtual wallet, a Citi-Pay$^{SM}$ virtual wallet, or other suitable virtual wallet application, etc. It should be appreciated that while the virtual wallet application 120 and the web browser 118 (and browser extension 124 associated with the web browser, as described below) are included in the one communication device 114, different devices may include the virtual wallet application 120 and the web browser 118 in other system embodiments. For example, the consumer 112 may browse a merchant's virtual location 116 at a desktop computing device, while maintaining the virtual wallet application 120 on a smartphone computing device.

The system 100 further includes a virtual wallet platform 122 (broadly, a virtual account platform). The virtual wallet platform 122 is illustrated as a standalone computing device (e.g., one or more servers, etc.) in FIG. 1, but may be included and/or incorporated in one or more other computing devices in other embodiments. For example, the virtual wallet platform 122 may be included and/or incorporated into the payment network 106 or the issuer 108, as indicated by the dotted lines, or elsewhere in the system 100 as desired in other system embodiments, etc. In this exemplary embodiment, the virtual wallet platform 122 is in communication with the payment network 106 and is configured to perform as a backend for one or more virtual wallet applications (e.g., virtual wallet application 120 installed at the consumer's communication device 114, etc.) and/or virtual pay browser extensions (e.g., the virtual pay browser extension 124, etc.), and/or is configured to provide interactions to facilitate payment account transactions, as described in detail herein, for example, in connection with the virtual pay browser extension 124. As such, the consumer 112 may use the virtual wallet application 120 at his/her communication device 114 to register his/her payment account with the virtual wallet platform 122 (whereby the payment account can then be used as described hereinafter), set up and/or define rules associated with use of his/her payment account through the virtual wallet platform 122, etc.

It should be understood that, in general, the consumer 112 has a virtual wallet account with the virtual wallet platform 122, in which the details of the consumer 112 (e.g., name, contact information, shipping address, etc.), payment account information of the consumer 112 (e.g., credentials, billing address, etc.), and/or other types of data or information are stored and/or included. In connection therewith, it should also be appreciated that the consumer 112 may then manage or otherwise interact with the virtual wallet account at the virtual wallet platform 122, for example, via the virtual wallet application 120 at his/her communication device 114.

While one merchant 102 (and one virtual location 116), one acquirer 104, one payment network 106, one issuer 108, and one virtual wallet platform 122 are illustrated in FIG. 1, it should be appreciated that any number of these entities (and their associated components) may be included in the system 100, or may be included as a part of systems in other embodiments, consistent with the present disclosure. Likewise, it should be appreciated that the system 100 and other system embodiments described herein are not limited to one consumer 112, one communication device 114, one web browser 118, one virtual wallet application 120, and one browser extension 124, as a different number of each may be included in other system embodiments.

Figure 2:
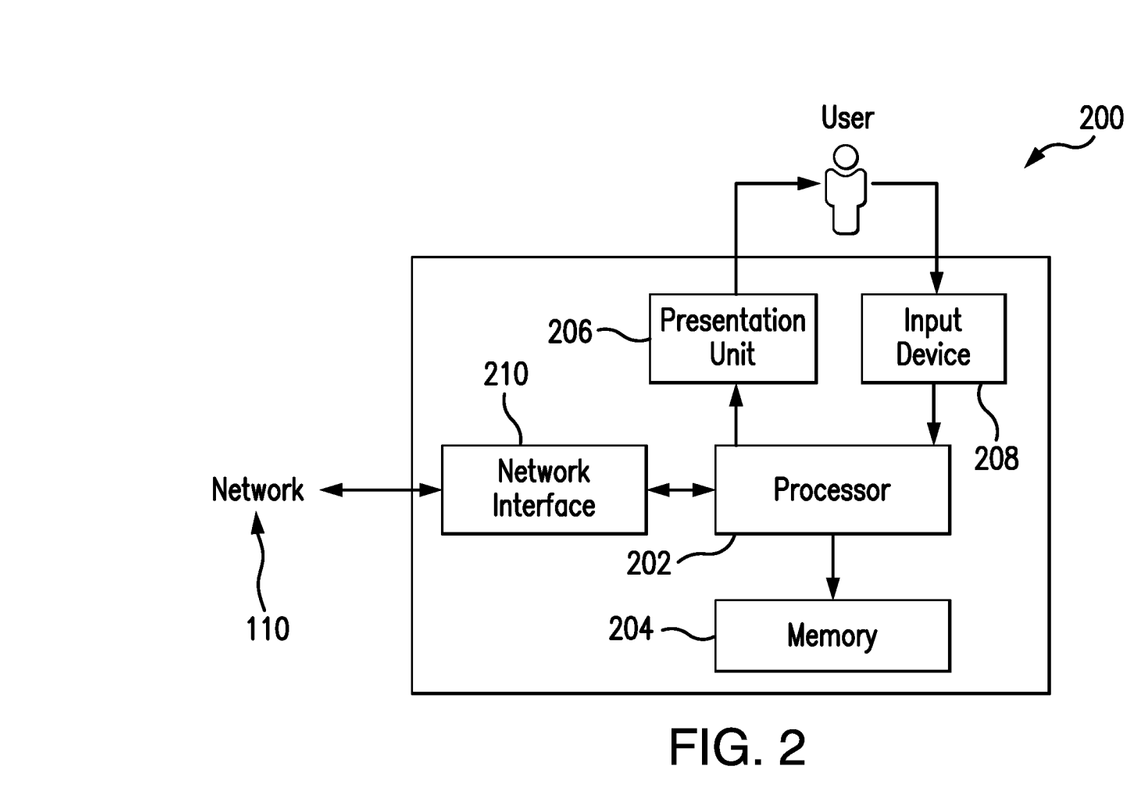
FIG. 2 is a block diagram of a computing device that may be used in the exemplary system of FIG. 1.

FIG. 2 illustrates an exemplary computing device 200 that can be used in the system 100. The computing device 200 may include, for example, one or more servers, workstations, personal computers, laptops, tablets, smartphones, etc. In addition, the computing device 200 may include a single computing device, or it may include multiple computing devices located in close proximity or distributed over a geographic region, so long as the computing devices are specifically configured to function as described herein (broadly, the computing device 200 may include on or more computing devices, etc.). In the exemplary embodiment of FIG. 1, each of the acquirer 104, the payment network 106, and the issuer 108 are illustrated as including, or being implemented in, computing device 200, coupled to (and in communication with) the network 110. In addition, the merchant 102 may also be considered as including and/or being implemented in at least one computing device consistent with computing device 200, which hosts the virtual location 116 (e.g., as a website, etc.). Further, the communication device 114 associated with consumer 112 and the virtual wallet platform 122 can also each be considered (or may each include and/or be associated with) a computing device consistent with computing device 200 for purposes of the description herein. However, the system 100 should not be considered to be limited to the computing device 200, as described below, as different computing devices and/or arrangements of computing devices may be used. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data, virtual wallet account information, payment account information (e.g., credentials, billing addresses, etc.), consumer details (e.g., names, contact information, shipping addresses, etc.), and/or other types of data (and/or data structures) suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 and/or other computer system components configured to perform one or more of the various operations herein. It should be appreciated that the memory 204 may include a variety of different memories, each implemented in one or more of the functions or processes described herein.

In the exemplary embodiment, the computing device 200 also includes a presentation unit 206 that is coupled to (and is in communication with) the processor 202 (however, it should be appreciated that the computing device 200 could include output devices other than the presentation unit 206, etc.). The presentation unit 206 outputs information (e.g., web browsers including virtual pay buttons, payment account information, confirmations of purchases, etc.), visually, for example, to a user of the computing device 200, such as the consumer 112 in the system 100, etc. And, various interfaces (e.g., as defined by websites, web browsers, browser extensions, etc.) may be displayed at computing device 200, and in particular at presentation unit 206, to display certain information. The presentation unit 206 may include, without limitation, a liquid crystal display (LCD), a light-emitting diode (LED) display, an organic LED (OLED) display, an "electronic ink" display, speakers, etc. In some embodiments, presentation unit 206 may include multiple devices.

In addition, the computing device 200 includes an input device 208 that receives inputs from the user (i.e., user inputs) such as, for example, inputs by the consumer 112 to the communication device 114 to select virtual payment, login credentials, etc. as further described below; etc. The input device 208 may include a single input device or multiple input devices. The input device 208 is coupled to (and is in communication with) the processor 202 and may include, for example, one or more of a keyboard, a pointing device, a mouse, a touch sensitive panel (e.g., a touch pad or a touch screen, etc.), another computing device, and/or an audio input device. Further, in various exemplary embodiments, a touch screen, such as that included in a tablet, a smartphone, or similar device, may behave as both presentation unit 206 and input device 208.

Further, the illustrated computing device 200 also includes a network interface 210 coupled to (and in communication with) the processor 202 and the memory 204. The network interface 210 may include, without limitation, a wired network adapter, a wireless network adapter, a mobile network adapter, or other device capable of communicating to one or more different networks, including the network 110. Further, in some exemplary embodiments, the computing device 200 includes the processor 202 and one or more network interfaces incorporated into or with the processor 202.

Referring again to FIG. 1, the system 100 includes the browser extension 124, which is installed and/or operable with the web browser 118 at the communication device 114 (and generally included in a toolbar of the web browser 118). For example, the browser extension 124 may be downloaded by the consumer 112 and installed at the communication device 114 in association with the web browser 118 (whereby a button associated with the browser extension 124 is then included in the toolbar of the web browser 118). Or, the browser extension 124 may be included with the web browser 118 (in the toolbar of the web browser 118) when installed at the communication device 114. In connection therewith, the browser extension 124 includes computer executable instructions, which when executed by the communication device 114, in combination with the web browser 118, configure the communication device 114 to operate as described herein (e.g., in association with the virtual wallet platform 122 to thereby facilitate payment account transactions at the merchant virtual location 116 there through, etc.). With that said, the browser extension 124 generally is a plugin to the web browser 118, which, in this exemplary embodiment, provides a virtual pay button to be added to the toolbar of the web browser 118 (e.g., particular to the virtual wallet platform 122, etc.), as is shown in FIG. 1.

In an example operation of the system 100, in connection with a purchase transaction by the consumer 112 at the merchant 102, the consumer 112 initially browses product(s) offered through the virtual location 116 of the merchant 102 via the web browser 118, for instance, at the consumer's communication device 114 (or other computing device having the web browser 118). When desired, the consumer 112 then selects one or more products to purchase, by adding the one or more products to a shopping cart at the virtual location 116, for example. And, when the consumer 112 selects to check-out and/or purchase the products, the virtual location 116 configures the communication device 114 to solicit a payment method from the consumer 112. In response, in this example, the consumer 112 selects the virtual pay browser extension 124 in the toolbar of the web browser 118, at the communication device 114. The communication device 114, then, is configured, by the browser extension 124, to call an API associated with the virtual wallet platform 122, from which virtual wallet account information for the consumer 112 is requested. Such virtual wallet account information may include, for example, details of the consumer 112 (e.g., name, contact information (e.g., phone number, email address, etc.), shipping address (e.g., a default in the consumer's virtual wallet account as managed through the virtual wallet application 120, etc.), etc.), payment account information for the payment account issued to the consumer 112 (e.g., a payment account credential(s) (e.g., a primary account number (PAN), a token, an expiration date for a corresponding payment device, a card verification code (CVC), etc.), a billing address, etc.), and/or other suitable data or information, etc. In connection therewith, the virtual wallet platform 122 may be configured to request login credentials associated with the virtual wallet account of the consumer 112, prior to providing the virtual wallet account information to the browser extension 124 (or otherwise authenticate the consumer 112). Regardless, in response, the virtual wallet platform 122 is configured to provide the requested virtual wallet account information to the browser extension 124 sufficient to initiate a transaction to a payment account of the consumer 112 (e.g., via a popup overlaying the virtual location 116 of the merchant 102 at the web browser 118, etc.).

It should be appreciated that in one or more other embodiments, the browser extension 124 may be configured to request virtual wallet account information for the consumer 112 from the virtual wallet application 120 installed at the communication device 114 (e.g., where the virtual wallet application 120 is provisioned with sufficient information to initiate a transaction to the payment account of the consumer 112 (e.g., provisioned with a payment account credential(s), etc.)).

In addition, the communication device 114 is configured, by the browser extension 124, to request, via another call to an API associated with the virtual location 116 of the merchant 102, a transaction amount for the purchase with the merchant 102 (and potentially other information regarding the transaction), via the virtual location 116. The request includes, generally, a session identifier (ID) associated with the product(s) included in the shopping cart to be purchased, so that the merchant 102 is permitted to identify the proper transaction and the proper transaction amount. It should be appreciated that the request may include other information, as required or desired, to determine the transaction amount or other desired information. For example, the request may include information specific to the consumer 112, such as, for example, shipping postal code, so that a cost of shipping and handling, or other information so that the cost of sales tax, if applicable, may be added to the transaction amount by the virtual location 116. In turn, the merchant 102, and more specifically, the virtual location 116, is configured to provide the transaction amount to the browser extension 124, via the API, along with information sufficient to compile an authorization request for the transaction (e.g., a merchant ID, an acquirer ID (e.g., for the acquirer 104 associated with the merchant 102, etc.), a payment gateway ID and/or address, and/or a transaction ID, etc.). In particular, for example, upon receipt of the transaction amount (and other information) from the merchant 102, the communication device 114 may be configured, by the browser extension 124, to compile (or cause to be compiled via the browser extension 124 and the popup provided by the virtual wallet platform 122) an authorization request (broadly, a request) for the transaction and submit the authorization request, via the network 110, to the payment network 106 (e.g., MasterCard®, VISA®, Discover®, American Express®, etc.) for processing, etc.

When the authorization request is submitted to the payment network 106, the payment network 106 is configured to pass the authorization request to the issuer 108 (as associated with the payment account of consumer 112). Thereafter, the issuer 108 determines whether the payment account is in good standing and whether there is/are sufficient funds and/or credit to cover the transaction. If the transaction is approved, an authorization reply or response (indicating the approval of the transaction) is transmitted back from the issuer 108 to the payment network 106, and to the browser extension 124 at the communication device 114. Thereafter, the communication device 114 is configured, by the web browser 118 and the browser extension 124, to provide a confirmation of the purchase to the merchant 102, which includes details of the transaction sufficient for the merchant 102 to cause delivery of the product(s) purchased to the consumer 112. It should be appreciated that in one or more other embodiments, the authorization reply or response may be transmitted back from the issuer 108 directly to the merchant 102, via the payment network 106, thereby permitting the merchant 102 to independently confirm that payment for the product(s) selected for purchase by the consumer 112 has been made.

It should also be appreciated that in one or more embodiments the browser extension 124 may be configured to submit the authorization request via the network 110 to the acquirer 104 (associated with the merchant 102), directly, or via a payment gateway (not shown), whereby the acquirer 104, in turn, communicates the authorization request to the payment network 106 so that the payment network 106 may then pass the authorization request to the issuer 108 for further processing (consistent with the above). It should further be appreciated that in one or more embodiments the browser extension 124 may be configured to generate and transmit transaction details for the given transaction to the payment network 106, the acquirer 104, etc. (broadly, as a request), whereby the payment network 106, the acquirer 104, etc. then generates the authorization request for the transaction based on the received transaction details (and process the authorization request in a generally conventional manner). As such, the request for the transaction generated and transmitted by the browser extension 124 may include the actual authorization request for the transaction or it may simply include transaction details for the transaction (whereby another entity then generates the authorization request).

Figure 3:
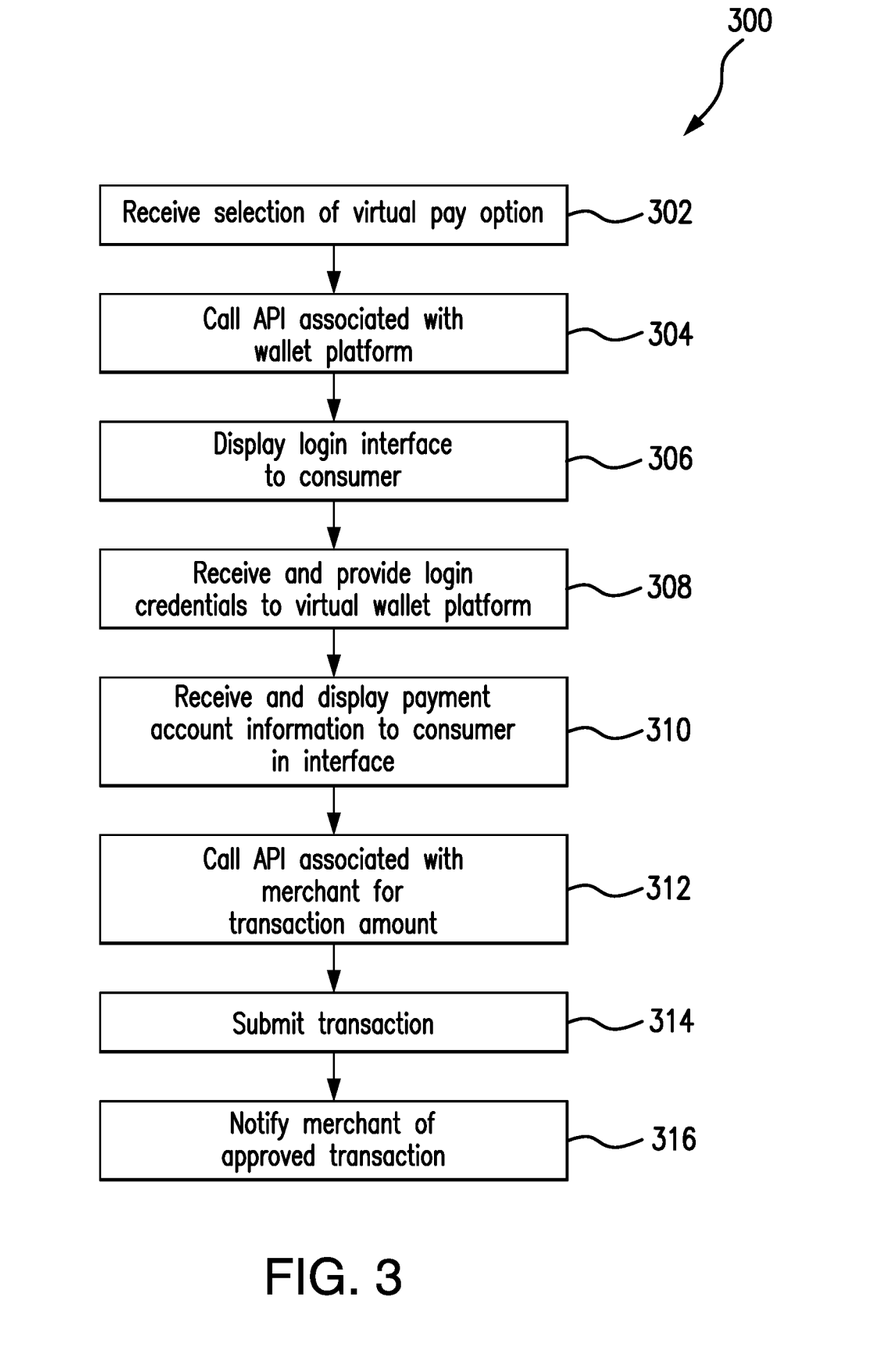
FIG. 3 is a flow diagram of an exemplary method, which may be implemented in connection with the system of FIG. 1, for use in facilitating a virtual wallet purchase transaction through a browser extensions associated with a web browser.

FIG. 3 illustrates an exemplary method 300 for use in facilitating payment account transactions, to virtual wallets, through browser extensions associated with web browsers. The exemplary method 300 is described as implemented generally in the web browser 118, the virtual wallet platform 122, and the browser extension 124 of the system 100, in connection with operations by the consumer 112, the merchant 102, and the virtual location 116. The method 300 is also described with reference to the computing device 200. That said, however, the methods herein should not be understood to be limited to the system 100 or the computing device 200, as the methods may be implemented in other systems and/or computing devices within the scope of the present disclosure. Likewise, the systems and the computing devices herein should not be understood to be limited to the exemplary method 300.

In general in the method 300, the consumer 112 initially accesses the virtual location 116 of the merchant 102 (via a computing device associated with the consumer 112 such as the communication device 114) and browses one or more products, prior to appending the one or more products to a shopping cart at the virtual location 116. Once the consumer 112 begins to browse products and/or after a first product is appended to the shopping cart, the virtual location 116 generates and/or maintains a session ID for the consumer 112 and/or the web browser 118, whereby the merchant 102 is permitted to identify the consumer's browsing and/or shopping cart contents via the web browser 118, etc. Then, after the consumer 112 concludes browsing products and determines to purchase the one or more products appended to the shopping cart, the consumer 112 selects the virtual pay option at the browser extension 124, in the toolbar of the web browser 118, at the communication device 114, for example (or other computing device at which the consumer 112 access the web browser 118 to view products at the merchant's virtual location).

In turn, the browser extension 124 receives the selection of the virtual pay option from the consumer 112, at 302. The browser extension 124 then calls, at 304, an API associated with the virtual wallet platform 122, i.e., a virtual wallet platform API. In general, the call includes a request for virtual wallet account information associated with the virtual wallet for the consumer 112 initiating the transaction at the virtual location 116 of the merchant 102. In response to the API call, the virtual wallet platform 122 requests login credentials for the consumer 112 from the browser extension 124 (e.g., to authenticate the consumer 112, etc.). In response, the browser extension 124 displays, at the communication device 114, a login interface to the consumer 112, at 306. For example, the login interface may include a lightbox displayed over a webpage associated with the virtual location 116 of the merchant 102, and may include a field for the consumer to enter a username and a password, or other suitable credential, for the consumer's virtual wallet account.

Thereafter, the browser extension 124 receives the login credentials from the consumer 112, via the login interface, and provides the login credentials, at 308, to the virtual wallet platform 122. It should be appreciated that in one or more embodiments, the consumer 112 may already be logged into the web browser 118, the browser extension 124, the virtual wallet platform 122, or otherwise (e.g., at the communication device 114, etc.), whereby the call to the virtual wallet platform API may include login credentials without the consumer 112 separately providing the credentials and/or such that a separate login of the consumer 112 may be omitted. In such embodiments, the browser extension 124, web browser 118, and/or virtual wallet platform 122 may rely on other manners of maintaining secure and/or authorized access to account information (e.g., tokens, session IDs, device passwords, biometrics, etc.).

In response to the login credentials, the virtual wallet platform 122 verifies the login credentials and retrieves virtual wallet account information for the consumer 112, including, for example, a payment account credential (e.g., a primary account number (PAN), a token, an expiration date of a payment device associated with the account, a card verification code (CVC), etc.), a name of the consumer 112, a billing address, a shipping address (e.g., a default in the virtual wallet account, etc.), a phone number for the consumer 112, an email address, and/or other suitable information, etc. Once retrieved, the account information is provided, by the virtual wallet platform 122, to the browser extension 124 (i.e., in response to the virtual wallet platform API call). The browser extension 124 then receives and displays, at 310, the virtual wallet account information, or a part thereof, for verification by the consumer 112 in one or more interfaces (e.g., lightboxes overlaid on a webpage associated with the virtual location 116, etc.). The interfaces may allow the consumer 112 to verify the account information (e.g., via a button, etc.), or not.

Separately in the method 300, the browser extension 124 calls a merchant API associated with the merchant 102, at 312, to retrieve a transaction amount for the payment account transaction. The merchant API call therefore includes a request for the transaction amount, for purchase of the one or more products appended to the shopping cart at the merchant's virtual location 116. As such, the request includes a session ID for the shopping cart, thereby permitting the merchant 102 and/or the virtual location 116 to locate the shopping cart and determine the transaction amount. In addition, other information may be provided, as required or desired, to determine the transaction amount or other information. For example, the merchant API call may include information specific to the consumer 112, such as, for example, a shipping postal code so that a cost of shipping and handling may be added to the transaction amount, or so that the cost of sales tax, if applicable, may be added to the transaction amount. In any case, in response to the merchant API call, the merchant 102 and/or the virtual location 116 determines the transaction amount and provides the transaction amount back to the browser extension 124, along with information sufficient to compile and generate an authorization request for the transaction (e.g., a merchant ID, an acquirer ID (e.g., for the acquirer 104 associated with the merchant 102, etc.), payment gateway ID and/or address, and/or a transaction ID, etc.).

With the transaction amount and the account information, the browser extension 124 next submits, at 314, a transaction for the one or more products. It should be appreciated that the submission of the transaction may be completed in a number of different manners. For example, the browser extension 124 may compile and submit an authorization request for the payment account transaction to the payment network 106 (based, at least in part, on the data retrieved via the API calls to the virtual wallet platform 122 and the to the merchant 102), whereby the payment network 106 conventionally transmits the authorization request to the issuer 108 of the consumer's payment account for processing (consistent with the description above in relation to FIG. 1, etc.). Alternatively, the browser extension 124 may compile and submit an authorization request for the payment account transaction to the acquirer 104 for the merchant 102 (or a payment gateway for the merchant 102). Or further, the browser extension 124 may compile and transmit transaction details for the transaction to the acquirer 104 or the payment network 106 (broadly, as a request), whereby the acquirer 104 or the payment network 106 then generate the actual authorization request for the transaction. In any case, and regardless of the manner in which the transaction is submitted, after the issuer 108 approves or declines the transaction (based on the authorization request for the transaction), the browser extension 124 is notified of the transaction being approved or declined in response to the authorization request. In turn, at 316, the browser extension 124 notifies the merchant 102 of the approved transaction, if approved, so that the one or more products may be delivered to the consumer 112. In addition, the browser extension 124 may provide a transaction confirmation to the consumer 112, for example, via an email associated with the consumer's virtual wallet account, or at a confirmation interface overlaid on the virtual location 116 and viewable by the consumer 112.

In view of the above, the systems and methods herein employ browser extensions, in web browsers used to access merchant virtual locations, to permit consumers to pay for selected products with virtual wallets. In connection therewith, the systems and methods herein provide for specific web browser extension configurations and operations to allow a web browser extension installed on a consumer device to interact with a remote virtual wallet platform, and to separately interact with a remote merchant virtual location, to facilitate a transaction between the consumer and the merchant, without requiring integration of the virtual wallet platform with the merchant virtual location, or requiring communication directly between the virtual wallet platform and the merchant virtual location. Such integration and communication can be technically complicated, time consuming, and expensive. Moreover, such integration and communication renders the ability of a consumer to pay for goods selected at a virtual merchant location dependent on the merchant's willingness and/or ability to integrate and/or communicate with the virtual wallet platform at the merchant virtual location, which may not even be possible depending on the merchant virtual location platform. In this manner and consistent with the above disclosure, the systems and methods herein deviate from the routine and conventional integration of a virtual wallet platform at a merchant virtual location and provide specific technical improvements to web browser extensions, virtual merchant locations, and virtual wallet capabilities to expand the ability to use virtual wallets at merchants where such use historically is not available.

As can be appreciated from the above, there often is a challenge of controlling the attention of consumers in the context of the Internet and in completing virtual transactions, whereby the systems and methods herein address such challenge by simplifying the consumers' ability to effect payment for such transactions. As described above, the systems and methods herein employ browser extensions, in web browsers used to access merchant virtual locations, whereby the consumers are permitted to pay with their virtual wallets in the absence of any integration of virtual wallet payment options into the merchant virtual locations and in the absence of the consumers having any merchant accounts with the merchants. As such, the systems and methods herein specify how interactions with the Internet are manipulated to yield a desired result, which overrides the routine and conventional sequence of events ordinarily triggered when purchasing products from merchants via their virtual locations (particularly when virtual wallet payment options are not integrated with the virtual locations). Thus, instead of the merchant virtual locations operating in their normal, expected manner by requiring other forms of payment to proceed with the underlying purchases, the systems and methods herein employ browser extensions, in web browsers used to access the merchant virtual locations, whereby the consumers are easily permitted to pay with their virtual wallets.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) accessing, by a computing device, a virtual location associated with an entity (e.g., a merchant, etc.) through a web browser; (b) receiving, at the computing device, from a user, a selection of a browser extension (e.g., a virtual pay browser extension, etc.) associated with the web browser, when at least one product is designated by the user, for example, to a shopping cart at the virtual location; (c) calling, by the computing device, a first application programming interface (API) (e.g., a virtual wallet platform API, etc.) associated with a virtual account platform (e.g., a virtual wallet platform, etc.) based on the selection of the browser extension, and requesting virtual account information for the user from the virtual account platform; (d) displaying at least part of the virtual account information received in response to the call to the first API; (e) calling, by the computing device, a second API (e.g., a merchant API, etc.) associated with the entity, and requesting a transaction amount for the at least one product (e.g., an amount to purchase the at least one product, etc.) designated by the user at the virtual location; and (f) submitting, by the computing device, a request (e.g., a request comprising transaction details, an actual authorization request, etc.) for a network transaction (e.g., a payment account transaction, etc.) based on the received virtual account information and received transaction amount (e.g., thereby permitting use of the browser extension to facilitate payment for the at least one product with a virtual account/wallet of the user, without the virtual account platform being actually integrated with the virtual location of the entity; etc.).

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

In addition, as used herein, the term product may include a good and/or a service.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in facilitating network transactions through browser extensions associated with web browsers, the computer-implemented method comprising:

accessing, by a computing device, a merchant website of a merchant, through a web browser;

designating at least one product to a shopping cart at the merchant website as part of a shopping session at the merchant between a user and the merchant website, wherein the shopping cart is associated with a session identifier that is unique to a duration of the shopping session;

receiving, at the computing device, from the user, in connection with the shopping session, a selection of a browser extension of the computing device installed to the web browser and separate from the merchant website, after the at least one product is designated to the shopping cart at the merchant website as part of the shopping session at the merchant, the browser extension associated with a virtual account platform;

in response to the selection of the browser extension, requesting, by the browser extension of the computing device, via a first application programming interface (API), virtual account information for the user from the virtual account platform;

displaying, by the browser extension of the computing device, at least part of the virtual account information received from the virtual account platform in response to the request to the first API;

requesting, by the browser extension of the computing device, from the merchant, via a second API associated with the merchant, a transaction amount for the shopping session, the request including the session identifier; and in response to receiving the transaction amount from the merchant, submitting, by the browser extension of the computing device, a request for a network transaction, between the merchant and the user, based on the virtual account information for the user and the transaction amount for the shopping session from the merchant, whereby the browser extension facilitates payment for the network transaction, via the virtual account platform in lieu of the virtual account platform being integrated into the merchant website of the merchant.

2. The computer-implemented method of claim 1, wherein displaying at least part of the virtual account information includes displaying at least part of the virtual account information in a lightbox overlaid on a webpage associated with the merchant website of the merchant.

3. The computer-implemented method of claim 1, further comprising soliciting, by the browser extension of the computing device, login credentials, via a login interface, from the user in connection with the first API and providing the login credentials, when received through the login interface, to the virtual account platform.

4. The computer-implemented method of claim 3, wherein soliciting the login credentials includes displaying a field for the user to enter the login credentials in a lightbox displayed overlaid on a webpage associated with the merchant website of the merchant.

5. The computer-implemented method of claim 1, further comprising notifying, by the browser extension of the computing device, the merchant that the network transaction is approved when a reply approving the network transaction is received at the computing device.

6. The computer-implemented method of claim 1, wherein the virtual account platform includes a virtual wallet platform; and wherein the method further comprises transmitting the request for the network transaction to a payment network associated with the virtual wallet platform.

7. The computer-implemented method of claim 6, wherein the request for the network transaction includes an authorization request for the network transaction.

8. The computer-implemented method of claim 6, wherein the virtual account information received via the first API includes a credential for a payment account of the user.

9. A system for facilitating transactions through browser extensions associated with web browsers, the system comprising:
- a memory including a web browser and a browser extension installed to the web browser, wherein the browser extension is separate from each of multiple websites, and wherein the multiple websites are each associated with a different one of multiple merchants; and
- a processor coupled to the memory;
- wherein the web browser includes computer-executable instructions, which when executed by the processor, cause the processor to access a first one of the multiple websites associated with a first one of the multiple merchants in response to an input by a user; and
- wherein the browser extension includes computer-executable instructions, which when executed by the processor in response to a selection by the user of the browser extension at the web browser, cause the processor to:
  - in connection with a shopping session by the user at the first one of the multiple websites accessed by the web browser, call a virtual wallet platform application programming interface (API) associated with a virtual wallet platform to request virtual wallet account information for a virtual wallet account associated with the user;
  - receive from the virtual wallet platform, via the virtual wallet platform API, the virtual wallet account information, the virtual wallet account information including at least payment account information for the user;
  - call a merchant API associated with the first one of the multiple merchants to request a transaction amount to purchase at least one product designated to a shopping cart at the first one of the multiple websites of the first one of the multiple merchants, the shopping cart associated with a session identifier that is unique to a duration of the shopping session by the user at the first one of the multiple websites and that is also included in the call to the merchant API, to permit the first one of the multiple merchants to identify the at least one product and determine the transaction amount to purchase the at least one product;
  - receive from the first one of the multiple merchants, via the merchant API, based on the session identifier, the transaction amount to purchase the at least one product; and
  - in response to the received virtual wallet account information and the received transaction amount, submit a request for a payment account transaction, between the first one of the multiple merchants and the user, based on the payment account information for the user and the received transaction amount to purchase the at least one product, whereby the user is permitted to use the browser extension installed to the web browser to facilitate payment for the at least one product using the virtual wallet account associated with the user without the virtual wallet platform being integrated with the first one of the multiple websites of the first one of the multiple merchants.

10. The system of claim 9, wherein the computer-executable instructions included in the browser extension, when executed by the processor, further cause the processor to display, at an output device in communication with the processor, the payment account information for the user received from the virtual wallet platform.

11. The system of claim 10, wherein the computer-executable instructions included in the browser extension, when executed by the processor, cause the processor, in connection with displaying the payment account information for the user, to display the payment account information in a lightbox overlaid on a webpage associated with the first one of the multiple websites of the first one of the multiple merchants; and
- wherein the computer-executable instructions included in the browser extension, when executed by the processor, further cause the processor to receive a selection of and/or a confirmation of the payment account information displayed in the lightbox prior to submitting the request for the payment account transaction.

12. The system of claim 9, wherein the computer-executable instructions included in the browser extension, when executed by the processor, further cause the processor to:
- solicit login credentials from the user, via a login interface, for the virtual wallet account associated with the user at the virtual wallet platform; and
- provide the login credentials, received through the login interface, to the virtual wallet platform in order to receive the payment account information for the user via the virtual wallet platform API.

13. The system of claim 9, wherein the computer-executable instructions included in the browser extension, when executed by the processor, cause the processor to notify the first one of the multiple merchants that the payment account transaction is approved when a reply approving the payment account transaction is received.

14. The system of claim 9, wherein the computer-executable instructions included in the web browser, when executed by the processor, cause the processor to include a button associated with the browser extension in a toolbar of the web browser, whereby the user selects the browser extension to initiate the payment account transaction.

15. The system of claim 9, wherein the request for the payment account transaction includes an authorization request for the payment account transaction; and
- wherein the computer-executable instructions included in the browser extension, when executed by the processor, further configure the processor to generate the authorization request for the payment account transaction based at least on the received payment account information for the user and the received transaction amount to purchase the at least one product.

16. A non-transitory computer-readable storage media including executable instructions for a browser extension installed to a web browser, which, when executed by at least one processor, cause the at least one processor to:
- include a button for a virtual wallet payment option in the web browser, the button associated with the browser extension installed to the web browser;
- receive a selection of the button from a user, when at least one product is designated to a shopping cart at a merchant website included at the web browser, wherein the shopping cart is associated with a session identifier that is unique to a session between the user and the merchant website, and wherein the browser extension is separate from the merchant website; and
- based on the selection of the virtual wallet payment option, via the button:
  - call a virtual wallet platform application programming interface (API) associated with a virtual wallet platform;

in response to the call to the virtual wallet platform API, receive from the virtual wallet platform, via the virtual wallet platform API, payment account information for a virtual wallet account associated with the user;

call a merchant API associated with the merchant website for a transaction amount, the call to the merchant API including the session identifier, thereby permitting the merchant to identify the at least one product and determine the transaction amount to purchase the at least one product;

in response to the call to the merchant API, receive, via the merchant API, the transaction amount to purchase the at least one product designated to the shopping cart at the merchant website;

submit a request for a payment account transaction, between the merchant and the user, based on the received payment account information for the user and the received transaction amount to purchase the at least one product, whereby the user is permitted to use the browser extension installed to the web browser to facilitate payment for the at least one product using the virtual wallet account associated with the user without the virtual wallet platform being integrated with the merchant website; and notify a merchant associated with the merchant website that the payment account transaction is approved when a reply approving the payment account transaction is received.

17. The non-transitory computer-readable storage media of claim 16, wherein the executable instructions, when executed by the at least one processor, further cause the at least one processor to:

solicit login credentials from the user, via a login interface, for the virtual wallet account associated with the user at the virtual wallet platform; and provide the login credentials, received through the login interface, to the virtual wallet platform in order to receive the payment account information for the user via the virtual wallet platform API.

18. The non-transitory computer-readable storage media of claim 17, wherein the executable instructions, when executed by the at least one processor, cause the at least one processor, in connection with calling the merchant API, to further receive at least one of: a merchant ID for the merchant, an acquirer ID for an acquirer associated with the merchant, a payment gateway ID, a payment gateway address, and/or a transaction ID.

\* \* \* \* \*